Dec. 24, 1957     J. J. FLOOD ET AL     2,817,749
FLEXIBLE NOZZLE FOR WELDING
Filed Jan. 12, 1956
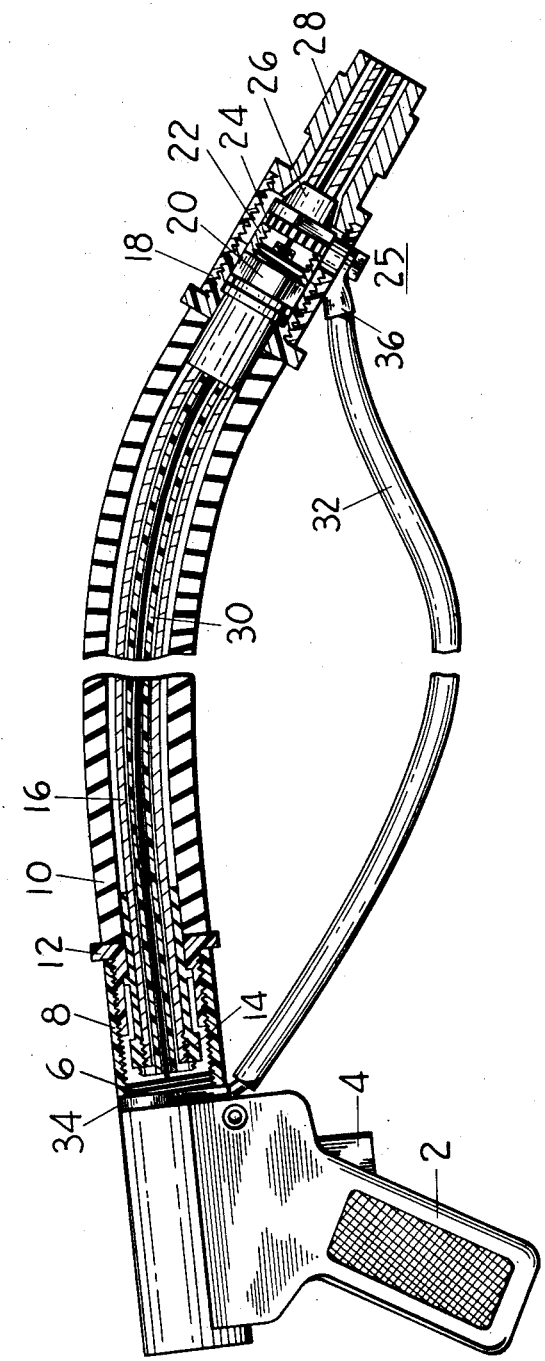
INVENTORS
JOHN J. FLOOD
EDWARD L. PULNIK
BY George Sipkin
Lee S. Huntzberger
ATTORNEYS

United States Patent Office 2,817,749
Patented Dec. 24, 1957

2,817,749

FLEXIBLE NOZZLE FOR WELDING

John J. Flood, West Medway, and Edward L. Pulnik, Lawrence, Mass.

Application January 12, 1956, Serial No. 558,811

1 Claim. (Cl. 219—130)

(Granted under Title 35, U. S. Code (1952), sec. 266)

The invention described herein may be manufactured and used by or for the Government of the United States of America for governmental purposes without the payment of any royalties thereon or therefor.

This invention relates to welding apparatus and more particularly to a flexible nozzle adapted for use in combination with a welding gun.

The conventional type welding gun, due to its straight barrel, presents great difficulty in welding inaccessible areas. For example, devices such as tripod masts, stiffeners on gun mounts and like devices cannot be effectively welded with such straight barrel gun.

It is accordingly the primary object of the present invention to provide a welding apparatus including a welding gun and a flexible nozzle therefor which permits effective welding in normally difficultly accessible areas.

It is a further object to provide a welding apparatus as set forth in the preceding object and including a flexible nozzle therefor which may be bent up to 180°.

In accordance with the present invention there is provided a welding apparatus which comprises a welding gun for providing a moving metal welding wire, an inert gas and a contact in an electrical circuit and a flexible nozzle therefor. The flexible nozzle comprises first flexible tubular insulating means which has one end affixed to a barrel extension on the gun and extends therefrom. A second flexible tubular insulating means coaxial and substantially coextensive with the first tubular means is disposed within the first tubular means and receives the moving wire, a space being provided between the first and second flexible tubular insulating means for gas flow. A nozzle extends from the other ends of the tubular means and a length of electric cable makes electrical contact one end with the gun and at the other end with the wire at a point within the nozzle.

Other objects and many of the attendant advantages of this invention will be readily appreciated as the same becomes better understood by reference to the following detailed description when considered in connection with the accompanying drawing wherein the sole figure is a side elevation, partly in section, of a preferred embodiment of the invention.

Referring now more particularly to the invention, numeral 2 indicates a welding gun provided with a conventional trigger 4. In practise, gun 2 has connected thereto an electric current source, a conduit connected to a source of compressed inert gas conventionally used in arc welding operations, and a moving welding wire which quite often will move to the gun within the conduit. Since the electric, gas and wire source for gun 2 are well known in the art, they have been omitted as their depiction and description is believed to be unnecessary. At the barrel end of gun 2 is an extension 6 which may be externally threaded. Threadedly engaging most of extension 6 is the end portion of an internally threaded insulating collar 8 which may also consist of a suitable material such as fiber. A length of flexible insulating tubing 10 externally threaded at both ends makes threaded engagement at one end with the other end of collar 8. The threaded ends of tubing 10 may terminate in flanged portions 12 to permit the formation of a butt joint between such portion and the end of collar 8. An insulating nut 14 which is internally threaded at one end makes threaded engagement with one end of a length of speedometer cable 16 which is externally threaded at both ends, cable 16 being substantially coextensive, coaxial, and disposed within flexible tubing 10. Thus collar 8 embraces the main portion of extension 6, insulating nut 14, an end portion of cable 16, and a threaded end of tubing 10.

Making threaded engagement with the other end of tubing 10 is one end of a second internally threaded insulating collar 18 similar to collar 8. A second insulating nut 20 similar to nut 14 has its internally threaded end in threaded engagement with the other end of cable 16.

Nut 20 abuts a spacer 22 and abutting spacer 22 is one face of an internally threaded ring 24 which is part of a stud assembly 25, the ring threadedly engaging a welding wire guide 26. A gas nozzle 28 threadedly engages the other end of second collar 18, guide 26 being disposed coaxially within nozzle 28. It is seen that second collar 18 embraces the other threaded end of tubing 10, insulating nut 20, spacer 22, stud assembly 25, a portion of guide 26 and gas nozzle 28. Coaxially disposed within cable 16, and slightly longer than the latter so that it extends a small distance beyond either end thereof is an insulating liner 30 which may consist of nylon or like material for receiving the moving welding wire. It is seen that in the path of the wire through gun 2 to nozzle 28, it is slightly exposed only within barrel extension 6 and a short distance beyond nut 20 before it enters guide 26.

A length of electric cable 32 has lugs 34 and 36 on each end thereof for completing the electric circuit between gun 2 and the welding wire. Lug 34 is intimately disposed around extension 6 between gun 2 and the end of collar 8. Lug 36 makes contact with ring 24 which is in turn in contact with guide 26. The electric circuit is completed at the wire in guide 26, through which the wire slidably moves.

Speedometer cable 16 is necessary to prevent nylon liner 30 from collapsing. Both ends of the speedometer cable 16 are insulated by means of nuts 14 and 20. Insulating collars 8 and 18 are necessary to prevent grounding of the live electric cable with the wire during welding operations. Nylon liner 30 insulates the welding wire and insures the free running thereof. Liner 30 may alternatively consist of any other suitable plastic.

To assemble the present invention, cable lug 34 is first threaded onto extension 6 and collar 8 is then threaded onto the remainder of the extension. Speedometer cable 16 is inserted into flexible tubing 10 and nuts 14 and 20 are then threaded onto the ends of speedometer cable 16. Nylon liner 30 is next inserted into the assembly of nuts 14 and 20 and speedometer cable 16. Flexible tubing 10 is now threaded into collar 8 until a butt joint forms between the end thereof and flange portion 12. Collar 18 is threaded over the other threaded end of tubing 16 and lug 36 is connected to stud assembly 25. Gas nozzle 28 is screwed into the end of collar 18 and guide 26 is threadably inserted into the stud assembly. It is seen that in the assembled form, a space is provided between flexible tubing 10 and speedometer cable 16.

In operation, to utilize the apparatus, trigger 4 is pressed, preferably with one hand while the other hand maneuvers and controls the nozzle. Upon pressing trigger 4, the inert gas being used flows through tubing 10, around speedometer cable 16 and then through collar 18 to the gas nozzle. Simultaneously, the welding wire is fed through liner 30 and guide 26 to the work area.

Obviously many modifications and variations of the present invention are possible in the light of the above teachings. It is therefore to be understood that within the scope of the appended claim the invention may be practiced otherwise than as specifically described.

We claim:

A welding gun comprising a flexible barrel, a coaxial speedometer cable radially spaced in said barrel, a coaxial electrically insulating flexible liner tube radially spaced in said speedometer cable, an electrically conducting guide at the discharge end of said tube, said tube and guide being adapted to have welding wire fed therethrough, and an electric cable outside and separate from said barrel, said electric cable being connected to said guide to complete the circuit through the wire.

References Cited in the file of this patent
UNITED STATES PATENTS

| | | |
|---|---|---|
| 2,510,204 | Baird | June 6, 1950 |
| 2,659,796 | Anderson | Nov. 17, 1953 |
| 2,666,832 | Landis et al. | Jan. 19, 1954 |
| 2,727,970 | Turbett | Dec. 20, 1955 |